(12) United States Patent
Ichikawa

(10) Patent No.: US 10,383,193 B2
(45) Date of Patent: Aug. 13, 2019

(54) LIGHTING CIRCUIT AND VEHICLE LAMP EMPLOYING SAME

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/893,415

(22) Filed: Feb. 9, 2018

(65) Prior Publication Data

US 2018/0168017 A1    Jun. 14, 2018

Related U.S. Application Data

(62) Division of application No. 15/225,332, filed on Aug. 1, 2016.

(30) Foreign Application Priority Data

Jul. 31, 2015  (JP) .................................. 2015-152676
Mar. 2, 2016   (JP) .................................. 2016-040218

(51) Int. Cl.
  *H05B 33/08* (2006.01)
  *H05B 37/02* (2006.01)
  *H05B 37/03* (2006.01)
  *B60Q 11/00* (2006.01)
  *H02M 1/32* (2007.01)
  (Continued)

(52) U.S. Cl.
  CPC .......... *H05B 37/0209* (2013.01); *B60C 11/00* (2013.01); *B60Q 1/04* (2013.01); *B60Q 11/00* (2013.01); *H02M 1/32* (2013.01); *H02M 3/155* (2013.01); *H05B 33/0815* (2013.01); *H05B 33/0887* (2013.01); *H05B 37/03* (2013.01)

(58) Field of Classification Search
  None
  See application file for complete search history.

(56) References Cited

U.S. PATENT DOCUMENTS 7,279,878 B2 * 10/2007 Ootani .................. H02M 3/156
                                                        323/222
7,643,322 B1 *  1/2010 Varga .................... H02M 3/156
                                                        307/66

(Continued)

FOREIGN PATENT DOCUMENTS

CN    102232264 A    11/2011
CN    104507243 A     4/2015
(Continued)

OTHER PUBLICATIONS

Office Action issued in counterpart Chinese Patent Application No. 2016106159379, dated Aug. 1, 2017 (13 pages).

(Continued)

*Primary Examiner* — Minh D A
*Assistant Examiner* — James H Cho
(74) *Attorney, Agent, or Firm* — Osha Liang LLP

(57) ABSTRACT

A lighting circuit utilizes a buck converter that supplies a drive current to a light source and is feedback-controlled so that the drive current comes close to a target current. An open-circuit detection circuit compares a potential difference between and input voltage and an output voltage of the buck converter with a threshold voltage.

6 Claims, 13 Drawing Sheets

(51) Int. Cl.
*B60Q 1/04* (2006.01)
*H02M 3/155* (2006.01)
*B60C 11/00* (2006.01)

(56) References Cited

U.S. PATENT DOCUMENTS

| | | |
|---|---|---|
| 2002/0141129 A1 | 10/2002 | Ribarich |
| 2004/0080273 A1 | 4/2004 | Ito et al. |
| 2010/0079124 A1 | 4/2010 | Melanson |
| 2012/0187847 A1 | 7/2012 | Hamamoto et al. |
| 2012/0314463 A1 | 12/2012 | Chen |
| 2012/0326618 A1* | 12/2012 | Kim ................ H05B 33/0818 315/224 |
| 2013/0038236 A1* | 2/2013 | Mitarashi ............. H02M 3/156 315/240 |
| 2013/0093404 A1 | 4/2013 | Park et al. |
| 2014/0152180 A1 | 6/2014 | Wolf et al. |
| 2014/0210353 A1 | 7/2014 | Chen |
| 2014/0252955 A1 | 9/2014 | Gunda et al. |

FOREIGN PATENT DOCUMENTS

| | | |
|---|---|---|
| EP | 2533608 A1 | 12/2012 |
| JP | 2004-134147 A | 4/2004 |
| JP | 2014-154448 A | 8/2014 |

OTHER PUBLICATIONS

Search Report issued in French Application No. 1657309, dated Mar. 2, 2018 (6 pages).

* cited by examiner

LIGHTING CIRCUIT AND VEHICLE LAMP EMPLOYING SAME

CROSS-REFERENCE TO RELATED APPLICATION

The present application claims the benefit of priority of Japanese Patent Application No. 2015-152676, filed on Jul. 31, 2016 and Japanese Patent Application No. 2016-040218, filed on Mar. 2, 2016, which are incorporated herein by reference.

TECHNICAL FIELD

The present invention relates to vehicle lamps used in vehicles etc. and, more particularly, to detection of an open-circuit failure occurring therein.

BACKGROUND ART

Conventionally, halogen lamps and HID (high-intensity discharge) lamps were the mainstream of light sources of vehicle lamps, in particular, headlights. However, in recent years, to replace such lamps, vehicle lamps using a semiconductor light source such as an LED(s) (light-emitting diode(s)) or a laser diode have come to be developed.

Vehicle lamps using a semiconductor light source are required to have a function of detecting an open-circuit abnormality due to open-circuit destruction of the semiconductor light source, coming-off of a harness, disconnection of an interconnection, or the like and notifying the vehicle side of it. FIGS. 1A and 1B are circuit diagrams of vehicle lamps 1r and 1s that are equipped with a lighting circuit having an open-circuit abnormality detecting function. These circuits are ones that the present inventor studied before the conception of the present invention and should not be considered to be part of the prior art.

A lighting circuit 10r shown in FIG. 1A is equipped with a buck converter 20 and an open-circuit detection circuit 30r. The lighting circuit 10r is supplied with a voltage $V_{BAT}$ from a battery 4 via a switch 6. The buck converter 20 lowers the voltage $V_{BAT}$ and supplies a resulting output voltage $V_{OUT}$ to a light source 2. The buck converter 20 is feedback-controlled by a converter controller (not shown) so that a drive current $I_{DRV}$ flowing through the light source 2 comes close to a target value $I_{REF}$ that governs a target light quantity of the light source 2.

The open-circuit detection circuit 30r shown in FIG. 1A is equipped with a sense resistor $R_S$ for current detection and a comparator 32r. The sense resistor $R_S$ is inserted in the path of the drive current $I_{DRV}$, and a voltage drop (current detection signal) $V_{IS}$ which is proportional to the drive current $I_{DRV}$ develops across the sense resistor $R_S$. The comparator 32r compares the current detection signal $V_{IS}$ with a threshold voltage $V_{TH}$.

When the vehicle lamp 1r shown in FIG. 1A is normal, a normal drive current $I_{DRV}$ flows through the sense resistor $R_S$ and a voltage drop $V_{IS}$ that is larger than the threshold voltage $V_{TH}$ occurs. On the other hand, if an open-circuit abnormality has occurred, no drive current $I_{DRV}$ flows, as a result of which the voltage drop $V_{IS}$ becomes substantially equal to 0 V and hence lower than the threshold voltage $V_{TH}$. Therefore, the output signal of the comparator 32r has a first level (e.g., high level) indicating that the vehicle lamp 1r is normal when $V_{IS} > V_{TH}$ and a second level (e.g., low level) indicating occurrence of an open-circuit abnormality when $V_{IS} < V_{TH}$.

The open-circuit detection circuit 30s shown in FIG. 1B is equipped with resistors R11 and R12 and a comparator 32s. The resistors R11 and R12 divide the output voltage $V_{OUT}$ of the buck comparator 20. The comparator 32s compares a divisional output voltage (voltage detection signal) $V_{VS}$ with a threshold voltage $V_{TH}$.

When the vehicle lamp 1s shown in FIG. 1B is normal, the output voltage $V_{OUT}$ is feedback-controlled to a voltage level that is most suitable for supply of a target current $I_{REF}$ to the light source 2. If an open-circuit abnormality has occurred, no drive current $I_{DRV}$ flows and the controller of the buck converter 20 increases the switching duty ratio so that the drive current $I_{DRV}$ comes closer to the target value $I_{DRV}$, as a result of which the output voltage $V_{OUT}$ increases. As a result, the voltage detection signal $V_{VS}$ exceeds the threshold voltage $V_{TH}$.

Therefore, the output signal of the comparator 32s has a first level (e.g., high level) indicating that the vehicle lamp 1s is normal when $V_{VS} < V_{TH}$ and a second level (e.g., low level) indicating occurrence of an open-circuit abnormality when $V_{VS} > V_{TH}$.

SUMMARY OF THE INVENTION

1. The present inventor studied the lighting circuits 10r and 10s shown in FIGS. 1A and 1B and recognized the following problems.

For a maintenance or test purpose, vehicle lamps having a laser diode as the light source 2 may be requested to operate in a low-luminance mode (test mode) in which the light source 2 is caused to light at a low luminance level. In this case, in the lighting circuit 10r shown in FIG. 1A, it is necessary that the threshold voltage $V_{TH}$ be set lower than a voltage detection signal $V_{IS}$ to occur in the low-luminance mode. However, since in the low-luminance mode the drive current $I_{DR}$ flowing through the light source 2 is faint and hence the voltage detection signal $V_{IS}$ is very low. Therefore, threshold voltage $V_{TH}$ needs to be set very low and hence the open-circuit detection circuit 30r is prone to be affected by an error.

The light source 2 may be composed of a series connection of plural LEDs and bypass switches that are parallel-connected to several respective ones of the LEDs. With this light source 2, the LED that is parallel-connected to a bypass switch can be on/off-controlled according to turning-on or off of the bypass switch.

In this case, the output voltage $V_{OUT}$ of the buck converter 20 is given by $$V_{OUT} \approx V_F \times N$$

where N is the number of on-LEDs. Therefore, the output voltage $V_{OUT}$ varies dynamically according to the number N of on-LEDs. In the lighting circuit 10s shown in FIG. 1B, it is difficult to determine the threshold voltage $V_{TH}$ properly when the output voltage $V_{OUT}$ varies dynamically.

2. The inventor also recognized the following problems that relate to an open-circuit failure.

Semiconductor light sources are vulnerable to an overcurrent. Particularly in laser diodes, COD (catastrophic optical damage) may be caused by an overcurrent and hence it is necessary to prevent a current that is larger than an absolute maximum rated current from flowing even instantaneously. Thus, laser diodes require severer overcurrent protection than other light sources.

Chattering (a repetition of switching between contact (normal state) and non-contact (open-circuit state)) may occur at the connector contact between the lighting circuit

10r (or 10s) and the light source 2. In an open-circuit state, the current detection signal $V_{IS}$ of the lighting circuit 10r becomes equal to 0 V and hence the duty ratio is increased so that the drive current $I_{DRV}$ comes close to the target value $I_{REF}$, as a result of which the voltage across the output capacitor increases. If a contact state of the connector contact is restored thereafter, an excess part of the charge stored in the output capacitor flows into the light source 2 to cause an overcurrent.

The present invention has been made in the above circumstances, and one object of the present invention is therefore to provide a lighting circuit capable of detecting an open-circuit abnormality properly. Another object of the present invention is to provide a lighting circuit capable of preventing an overcurrent.

Means for Solving the Problems

1. A first aspect of the present invention provides a lighting circuit comprising a buck converter which supplies a drive current to a light source and is feedback-controlled so that the drive current comes close to a target current; and an open-circuit detection circuit which compares a potential difference between an input voltage and an output voltage of the buck converter with a prescribed threshold voltage.

If an open-circuit abnormality has occurred in a load of the buck converter, the drive current becomes zero and feedback is made in such a direction as to increase the output voltage to increase the drive current, whereby the input-output potential difference of the buck converter comes close to zero. According to this lighting circuit, an open-circuit abnormality can be detected on the basis of the input-output potential difference of the buck converter.

The open-circuit detection circuit may comprise a pnp bipolar transistor whose emitter and base are connected to an input terminal and an output terminal of the buck converter, respectively. The turning-on and off of the bipolar transistor correspond to non-detection and detection of an abnormality, respectively. Cost reduction is attained because no voltage comparator is necessary.

The open-circuit detection circuit may further comprise a first resistor that is provided between the collector of the bipolar transistor and the ground.

The open-circuit detection circuit may comprise a p-channel FET (field-effect transistor) whose source and gate are connected to an input terminal and an output terminal of the buck converter, respectively. The turning-on and off of the FET correspond to non-detection and detection of an abnormality, respectively. Cost reduction is attained because no voltage comparator is necessary.

The open-circuit detection circuit may further comprise a clamp element that is provided between the gate and the source of the FET. With this measure, the gate-source voltage can be kept lower than a breakdown voltage.

The open-circuit detection circuit may further comprise a second resistor that is provided between the drain of the FET and the ground.

2. A second aspect of the present invention provides a lighting circuit comprising a converter which has an output inductor, supplies a drive current to a light source via the output inductor, and is feedback-controlled so that the drive current comes close to a target current; and a protection circuit which suspends a switching operation of the converter for a suspension time upon detecting a recovery from an open-circuit state to a normal state at an output terminal of the converter.

If an open-circuit state occurs, the detection value of a drive current becomes equal to 0 A and hence the duty ratio of the converter is increased to increase its output voltage. Upon a recovery to a normal state, an excess part of the charge stored in an output capacitor is supplied to the light source via the output inductor. Since the output inductor constitutes a resonance circuit together with the output capacitor, a limited resonance current flows through the light source and hence an overcurrent is prevented.

If the resonance current $I_{RES}$ were superimposed on a drive current generated by the feedback control, an overcurrent would occur. In contrast, by delaying the restart of a switching operation of the converter at the time of a recovery from an open-circuit state to a normal state, a drive current occurs after the current flowing through the resonance circuit has become small, whereby an overcurrent can be prevented.

The protection circuit may be such as to judge that a recovery from an open-circuit state to a normal state has occurred when the output voltage of the converter has dropped rapidly. For example, the phrase "the output voltage of the converter has dropped rapidly" includes an event that the gradient of the output voltage has exceeded a prescribed threshold value, an event that a variation of the output voltage in a prescribed time has exceeded a prescribed threshold value, an event that the output voltage has experienced a prescribed variation in a time that is shorter than a prescribed time. A recovery from an open-circuit state to a normal state can be detected in this manner.

The protection circuit such as to increase a switching duty ratio of the converter slowly after a lapse of the suspension time. With this measure, the drive current increases slowly upon a restart of the switching operation and hence an overcurrent can be prevented more reliably.

The protection circuit such as to set the target current equal to 0 A during the suspension period and to increase the target current slowly after a lapse of the suspension time.

The protection circuit may be such as to suspend a switching operation of the converter for a suspension time upon detecting a recovery from a short-circuit state to a normal state at the output terminal of the converter. By delaying the restart of a switching operation of the converter at the time of a recovery from a short-circuit state to a normal state, a drive current occurs after the current flowing through the resonance circuit has become small, whereby an overcurrent can be prevented.

The protection circuit may be such as to judge that a recovery from a short-circuit state to a normal state has occurred when the output voltage of the converter has risen rapidly. A recovery from a short-circuit state to a normal state can be detected in this manner.

The protection circuit may comprise a differentiation circuit or a highpass filter which receives the output voltage of the converter, and judge that a recovery to a normal state has occurred as soon as an output signal of the differentiation circuit or a highpass filter has exceeded a prescribed value.

The protection circuit may comprise a capacitor one end of which is grounded, a charging resistor which is connected to the other end of the capacitor and applies, to the capacitor, a target voltage that determines the target current in the normal state, and a discharge switch which is provided parallel with the capacitor and turned on upon the detection of the recovery to the normal state.

The converter may a buck converter, and the lighting circuit may further comprise an open-circuit detection circuit which compares a potential difference between an input voltage and an output voltage of the converter with a prescribed threshold voltage.

A third aspect of the present invention provides a vehicle lamp comprising a light source; and any of the above-described lighting circuits which drives the light source.

The one aspect of the present invention makes it possible to detect an open-circuit abnormality properly. The first aspect of the present invention makes it possible to detect an open-circuit abnormality properly. The second aspect of the present invention makes it possible to prevent an overcurrent.

DETAILED DESCRIPTION

Figure 1A:
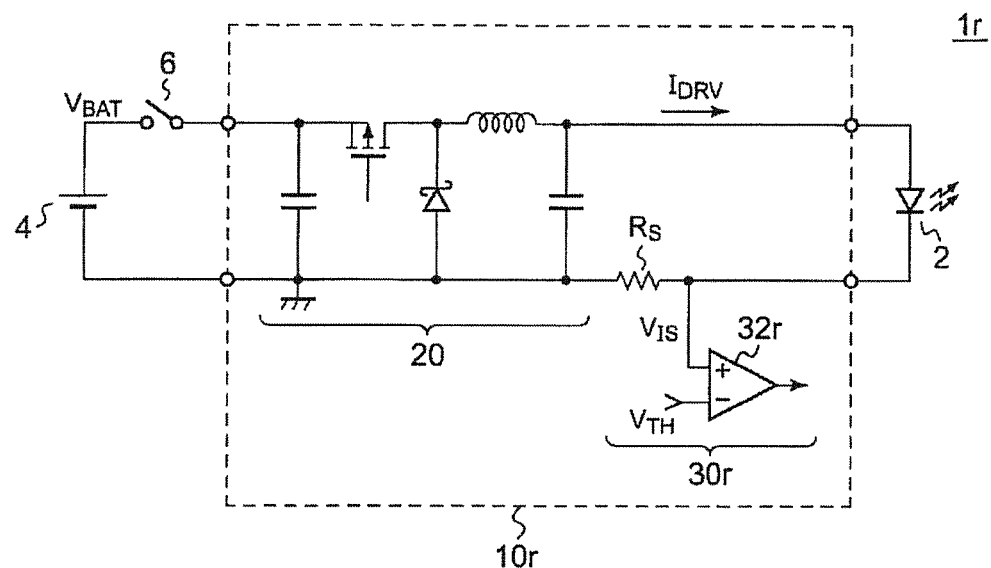
FIGS. 1A and 1B are circuit diagrams of vehicle lamps that are equipped with a lighting circuit having an open-circuit abnormality detecting function.
Figure 1B:
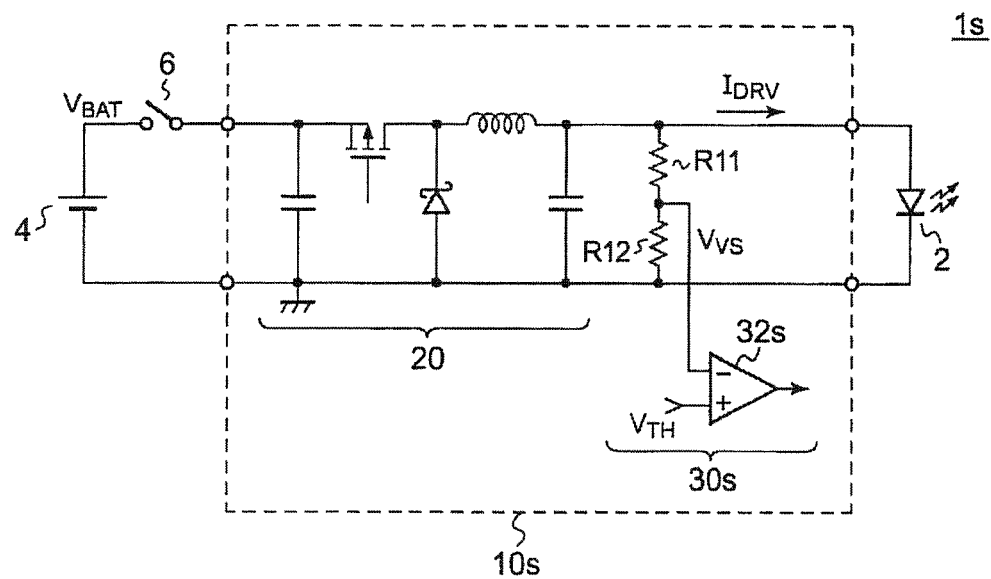

Preferred embodiments of the present invention will be hereinafter described with reference to the drawings. The same or equivalent components are given the same reference symbols in the drawings, and redundant descriptions therefor may be omitted as appropriate. The embodiments are just examples and should not be construed as restricting the present invention, and features to be described in the embodiments or combinations thereof are not necessarily essential to the present invention.

In this specification, a state that "component A is connected to component B" includes not only a case that components A and B are connected to each other directly but also a case that they are connected to each other indirectly via another component that has substantially no influence on their electrical connection state or does not impair a function or effect to be attained by their connection.

Likewise, a state that "component C is provided between components A and B" includes not only a case that components A and C or components B and C are connected to each other directly but also a case that they are connected to each other indirectly via another component that has substantially no influence on their electrical connection state or does not impair a function or effect to be attained by their connection.

In this specification, a symbol that denotes an electrical signal such as a voltage signal or a current signal or a circuit element such as a resistor or a capacitor represents its voltage, current, resistance, capacitance or the like when necessary.

Those skilled in the art would understand that replacement between a bipolar transistor, a MOSFET, and an IGBT (insulated gate bipolar transistor), replacement between a p-channel (or pnp) transistor and an n-channel (or npn) transistor, high-side/ground inversion of a power source are possible.

(Embodiment 1)

Figure 2:
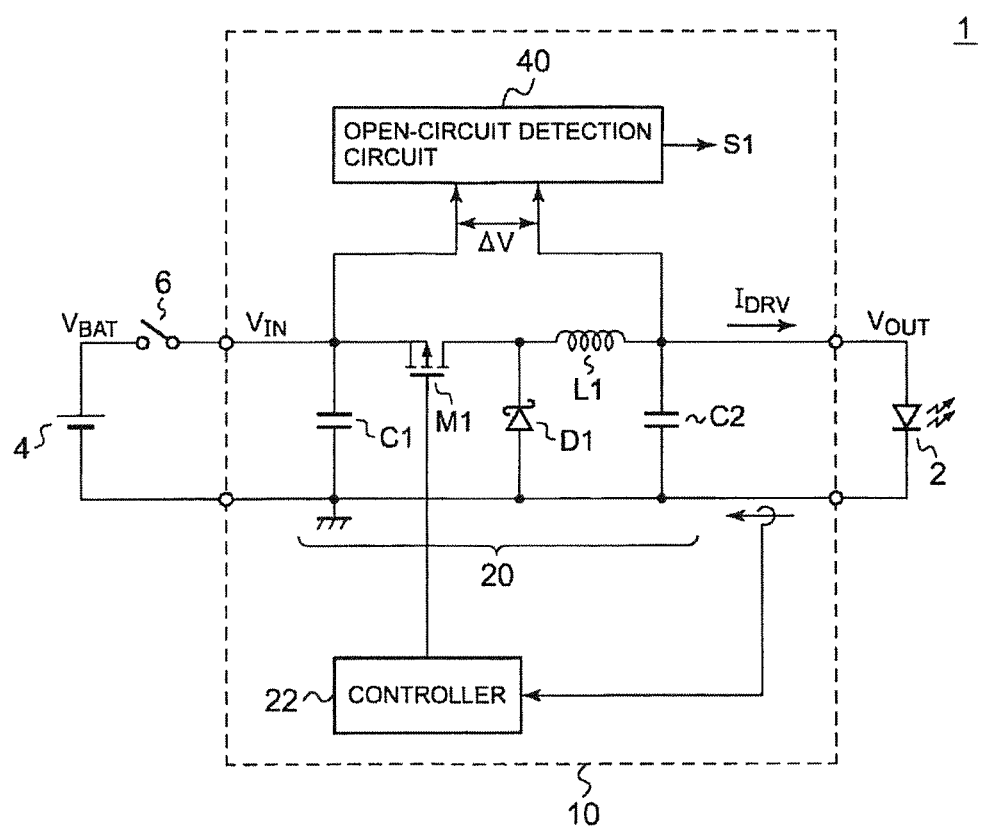
FIG. 2 is a circuit diagram of a vehicle lamp according to a first embodiment of the present invention.

FIG. 2 is a circuit diagram of a vehicle lamp 1 according to a first embodiment. The vehicle lamp I is equipped with a light source 2 and a lighting circuit 10. The lighting circuit 10 is equipped with a buck converter 20, a controller 22, and an open-circuit detection circuit 40.

The lighting circuit 10 is supplied with a voltage $V_{BAT}$ from a battery 4 via a switch 6. The buck converter 20 lowers an input voltage $V_{IN}$ that corresponds to the battery voltage $V_{BAT}$ and supplies a resulting output voltage $V_{OUT}$ to a light source 2. The buck converter 20 is feedback-controlled by a converter controller 22 so that a drive current $I_{DRV}$ flowing through the light source 2 comes close to a target value $I_{REF}$ that governs a target light quantity of the light source 2.

The buck converter 20 includes an input capacitor C1, an output capacitor C2, a switching transistor M1, a rectification diode D1, and an inductor L1. The controller 22 generates a pulse signal $S_{PWM}$ whose duty ratio is varied so that the drive current $I_{DRV}$ comes close to the target value $I_{REF}$, and controls the switching transistor M1 using the pulse signal $S_{PWM}$. There are no particular limitations on the control method of the controller 22; it may be either a hysteresis control (bang-bang control) or a feedback control using an error amplifier.

The open-circuit detection circuit 40 compares, with a prescribed threshold voltage $V_{TH}$, a potential difference $\Delta V$ between the input voltage $V_{IN}$ and the output voltage $V_{OUT}$ of the buck converter 20. If $\Delta V > V_{TH}$, the open-circuit detection circuit 40 judges that the lighting circuit 10 is normal and outputs an abnormality detection signal S1 having a first level (e.g., high level). If $\Delta V < V_{TH}$, the open-circuit detection circuit 40 judges that an open-circuit abnormality has occurred and outputs an abnormality detection signal S1 having a second level (e.g., low level).

Figure 3:
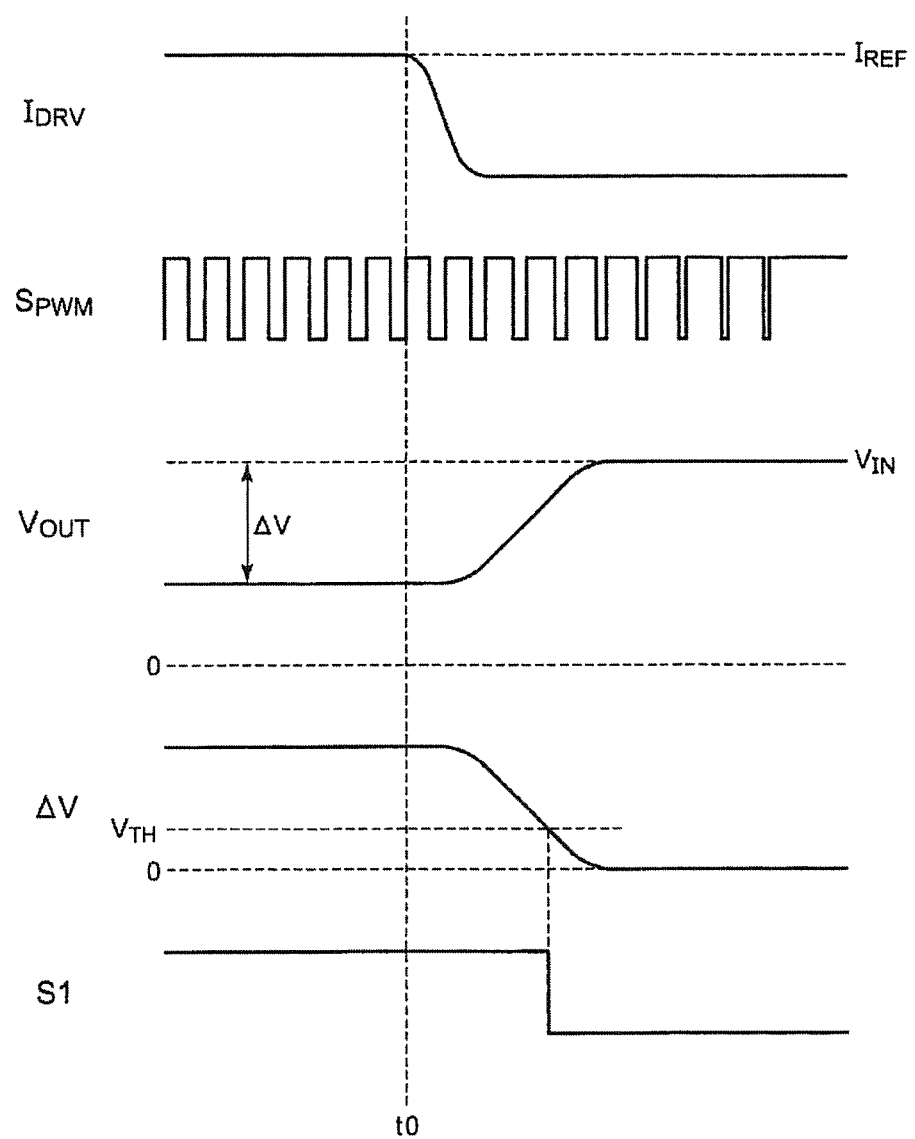
FIG. 3 is an operation waveform diagram of a lighting circuit shown in FIG. 2.

The basic configuration of the lighting circuit 10 has been described above. Next, a description will be made of how it operates. FIG. 3 is an operation waveform diagram of the lighting circuit 10 shown in FIG. 2. Before time t0, the vehicle lamp 1 is normal and the drive current $I_{DRV}$ is stabilized to the target value $I_{REF}$. In this state, the output voltage $V_{OUT}$ is stabilized to a certain voltage level.

If an open-circuit abnormality occurs at time t0, the drive current $I_{DRV}$ is shut off and becomes equal to 0 A. The controller 22 increases the duty ratio of the pulse signal $S_{PWM}$ to make the drive current $I_{DRV}$ come closer to the target value $I_{REF}$. In response, the output voltage $V_{OUT}$ increases and soon becomes equal to the input voltage $V_{IN}$. The open-circuit detection circuit 40, which monitors the potential difference $\Delta V (=V_{IN}-V_{OUT})$, turns the abnormality detection signal S1 to the low level when a relationship $\Delta V < V_{TH}$ is established at time t1.

How the lighting circuit 10 operates has been described above. The lighting circuit 10 can detect an open-circuit abnormality on the basis of the input-output potential difference ΔV of the buck converter 20.

An open-circuit abnormality can be detected properly even in a case that the lighting circuit 10 is used in a vehicle lamp 1 having a laser diode as the light source 2 and the lighting circuit 10 is set to a low-luminance mode in which the drive current $I_{DRV}$ is set faint. An open-circuit abnormality can also be detected properly even in a case that the lighting circuit 10 is used in a vehicle lamp 1 in which the light source 2 includes a series connection of LEDs and a turning-on/off control therefor is performed by bypass switches, in spite of a dynamic variation of the output voltage $V_{OUT}$.

The present invention should be grasped on the basis of the circuit diagram of FIG. 2 that includes the blocks, and encompasses various devices and circuits that are derived from the above description. Thus, the present invention should not be construed as being restricted to any particular configuration. More specific configurations will be described below to help understand the essence and the circuit operation of the present invention and to clarify them rather than narrow the scope of the present invention.

Figure 4A:
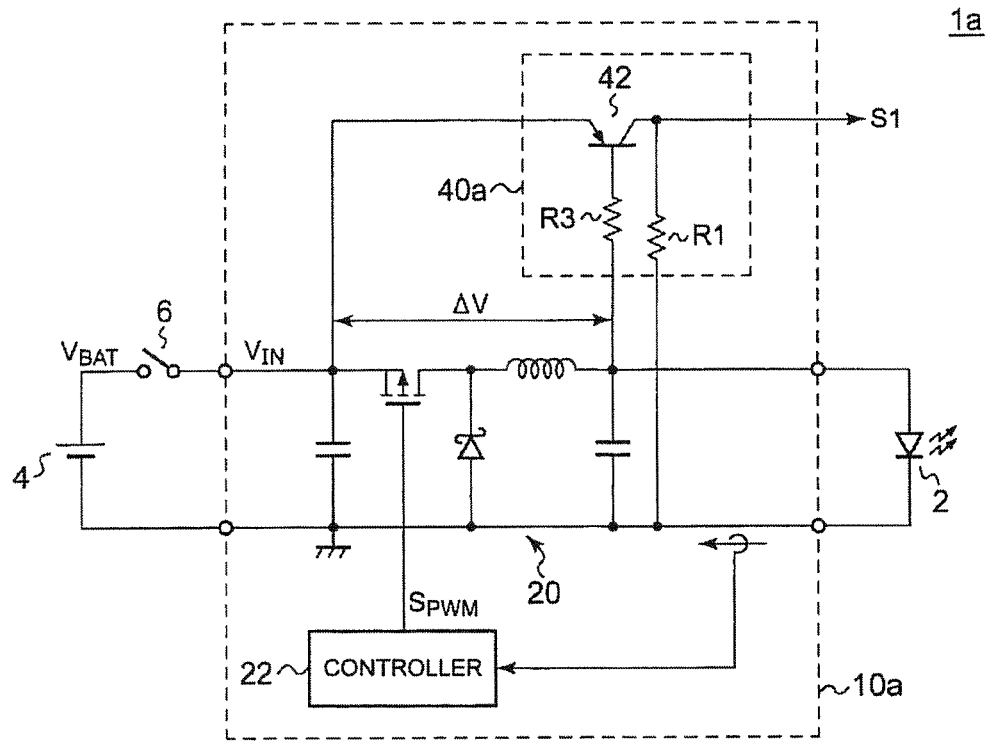
FIGS. 4A and 4B are circuit diagrams showing the configurations of specific vehicle lamps, respectively.
Figure 4B:
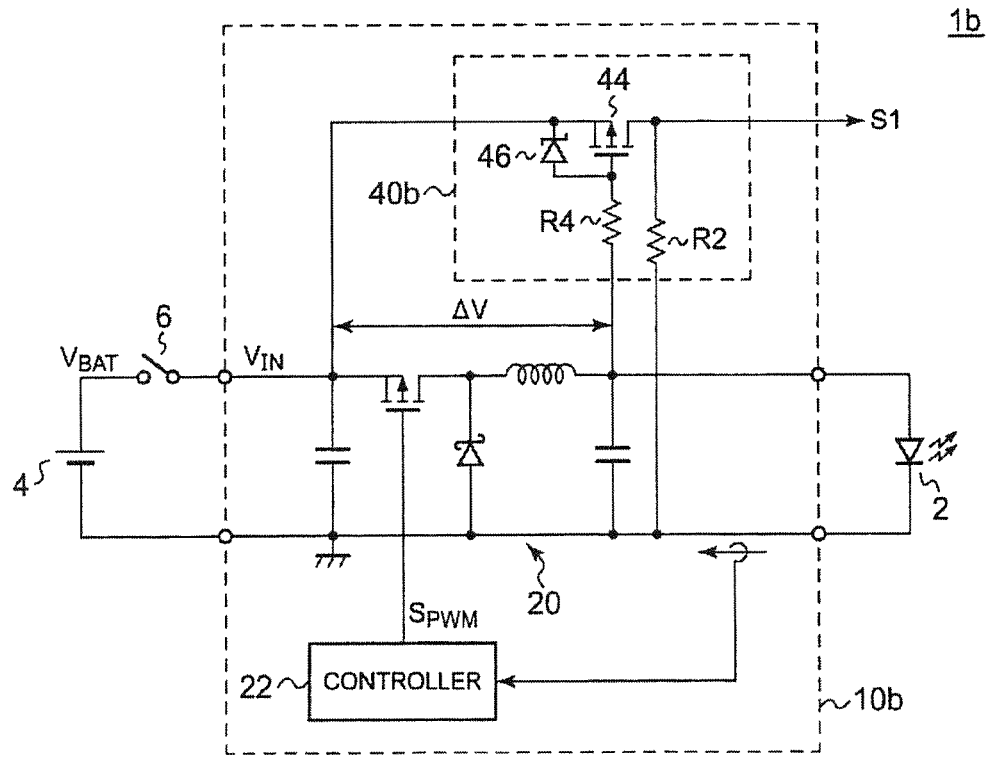

FIGS. 4A and 4B are circuit diagrams showing the configurations of specific vehicle lamps 1a and 1b, respectively. An open-circuit detection circuit 40a shown in FIG. 4A includes a pnp bipolar transistor 42, a first resistor R1, and a base resistor R3. The emitter of the bipolar transistor 42 is connected to the input terminal of the buck converter 20 and its base is connected to the output terminal of the buck converter 20 via the base resistor R3. The first resistor R1 is provided between the collector of the bipolar transistor 42 and the ground. The first resistor R1 may be omitted to provide an open-collector output. And the base resistor R3 may be omitted.

The input-output potential difference ΔV of the buck converter 20 is input between the base and the emitter of the bipolar transistor 42. When the vehicle lamp 1a is normal, since the potential difference ΔV is sufficiently large, the bipolar transistor 42 is turned on and the abnormality detection signal S1 is at a high level ($V_{IN}$). If an open-circuit abnormality has occurred, the input-output potential difference ΔV becomes smaller than the base-emitter threshold voltage (0.6 to 0.7 V) of the bipolar transistor 42, as a result of which the bipolar transistor 42 is turned off and the abnormality detection signal S1 comes to have a low level. That is, the turning-on and off of the bipolar transistor 42 correspond to non-detection and detection of an abnormality, respectively. As such, the vehicle lamp 1a shown in FIG. 4A enables circuit cost reduction because it does not require a voltage comparator.

An open-circuit detection circuit 40b shown in FIG. 4B is considered a circuit that is obtained by replacing the bipolar transistor 42 of the open-circuit detection circuit 40a shown in FIG. 4A with a p-channel FET 44. The source of the FET 44 is connected to the input terminal of the buck converter 20 and its gate is connected to the output terminal of the buck converter 20 via a gate resistor R4. A second resistor R2 is provided between the drain of the FET 44 and the ground. A clamp element 46 is provided between the gate and the source of the FET 44 and clamps the gate-source voltage so that it does not exceed a prescribed value. The clamp element 46 can be a Zener diode, a Schottky diode, or the like.

The input-output potential difference ΔV of the buck converter 20 is input between the gate and the source of the FET 44. When the vehicle lamp 1b is normal, since the potential difference ΔV is sufficiently large, the FET 44 is turned on and the abnormality detection signal S1 is at a high level ($V_{IN}$). If an open-circuit abnormality has occurred, the input-output potential difference ΔV becomes smaller than the threshold voltage $V_{GS(TH)}$ (e.g., 1.5 V) of the FET 44, as a result of which the FET 44 is turned off and the abnormality detection signal S1 comes to have a low level. That is, the turning-on and off of the FET 44 correspond to non-detection and detection of an abnormality, respectively. As such, the vehicle lamp 1b shown in FIG. 4B enables circuit cost reduction because it does not require a voltage comparator.

Figure 5A:
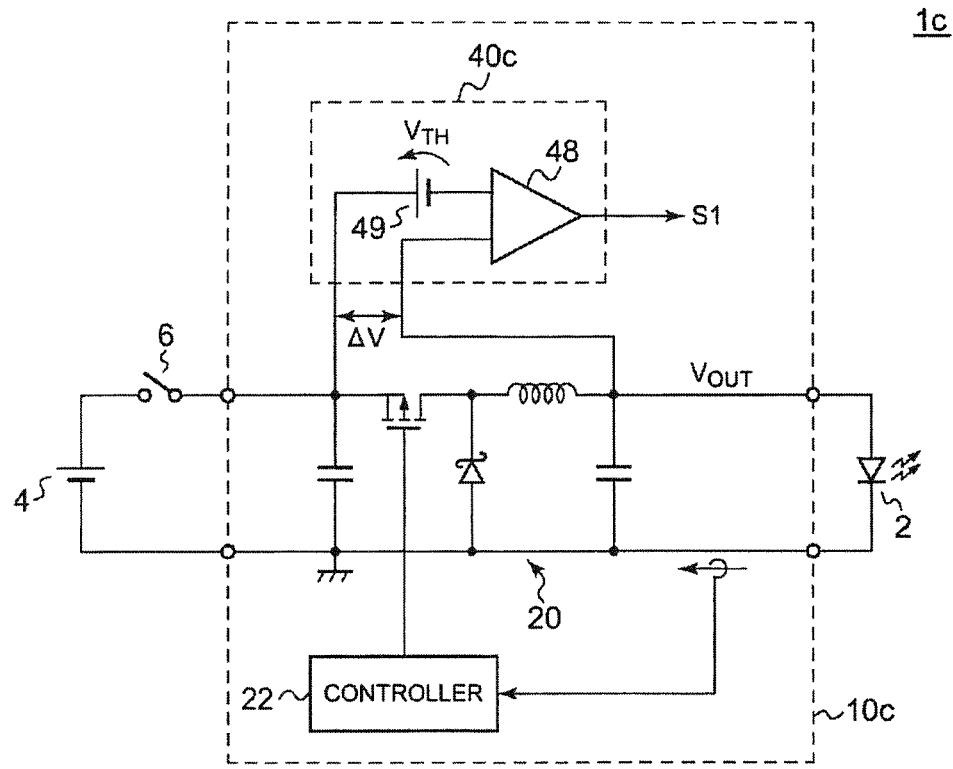
FIGS. 5A and 5B are circuit diagrams showing the configuration of another specific vehicle lamp.
Figure 5B:
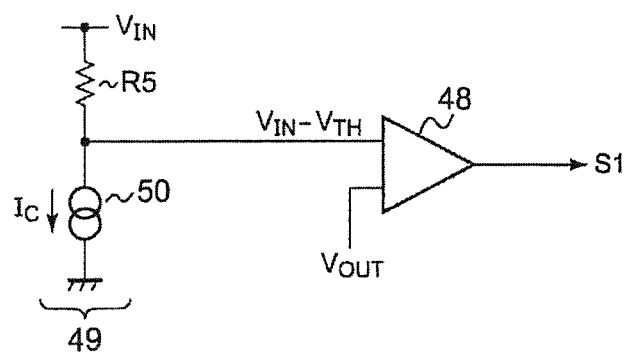

FIGS. 5A and 5B are circuit diagrams showing the configuration of another vehicle lamp 1c. As shown in FIG. 5A, an open-circuit detection circuit 40c of the vehicle lamp 1c employs a voltage comparator 48. The voltage comparator 48 may compare, with the output voltage $V_{OUT}$, a voltage obtained by shifting the input voltage $V_{IN}$ to the low-voltage side by a voltage shift $V_{TH}$. The voltage shift $V_{TH}$ is produced by a level shifter 49.

FIG. 5B is a circuit diagram showing the configuration of an example level shifter 49. For example, the level shifter 49 includes a resistor R5 and a current source 50. One end of the resistor R5 is connected to the input terminal of the buck converter 20 and the other end is connected to the current source 50. The current source 50 generates a prescribed constant current $I_C$. A voltage $V_{IN} - R5 \times I_C$ occurs at the connection point of the resistor R5 and the current source 50. That is, the voltage $R5 \times I_C$ serves as the voltage shift $V_{TH}$.

Because of the use of the voltage comparator 48, the vehicle lamp 1c enables accurate voltage comparison at the sacrifice of cost increase. If a comparator circuit including plural voltage comparators is used and an extra voltage comparator remains, no cost increase occurs.

(Embodiment 2)

Figure 6:
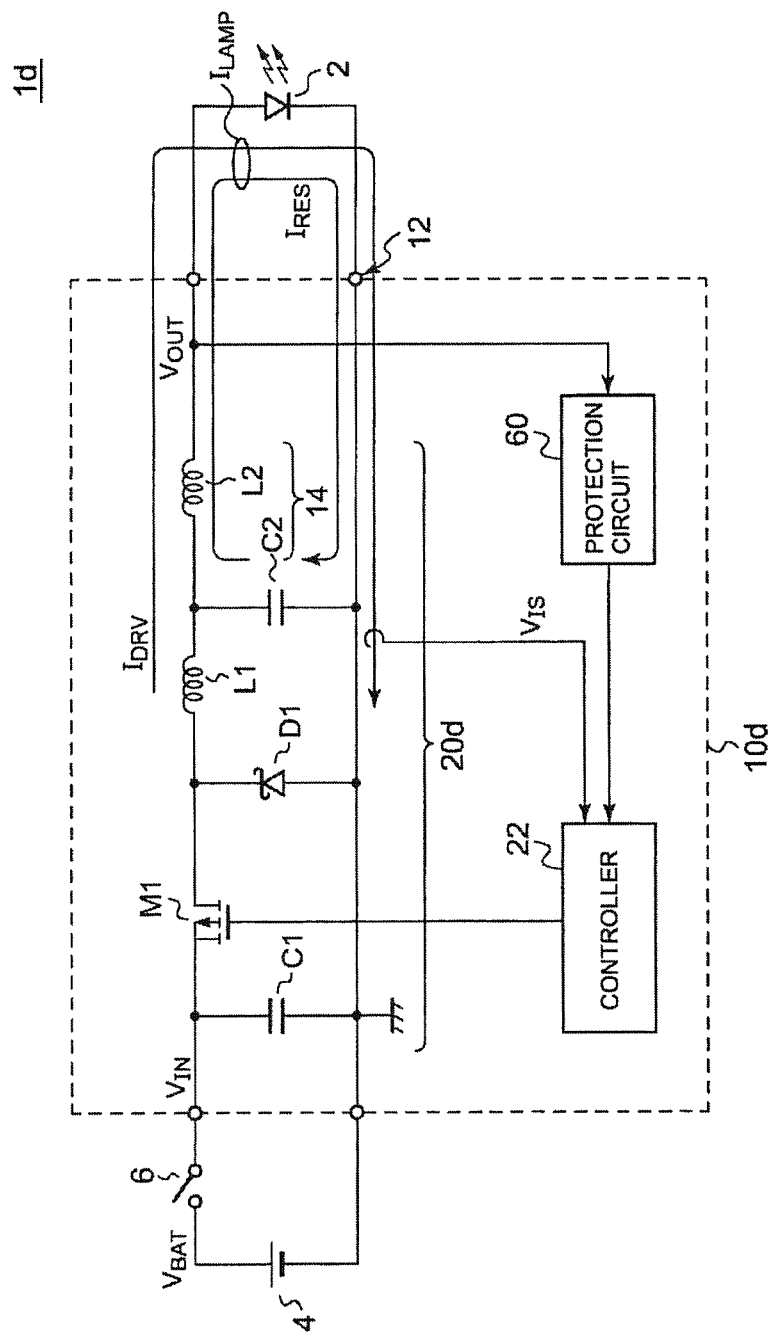
FIG. 6 is a circuit diagram of a vehicle lamp according to a second embodiment.

FIG. 6 is a circuit diagram of a vehicle lamp 1d according to a second embodiment. For example, a connector 12 is provided between a light source 2 and a lighting circuit 10d, whereby the light source 2 and the lighting circuit 10d are connected to each other detachably. The lighting circuit 10d is equipped with a buck converter 20d, a controller 22, and a protection circuit 60. The technique to be described in the second embodiment can be used in combination with that described in the first embodiment. Therefore, the lighting circuit 10d can be equipped with the above-described open-circuit detection circuit 40 additionally though it is omitted in FIG. 6.

The lighting circuit 10d is different from the lighting circuit 10 shown in FIG. 2 in being additionally provided with an output inductor L2 between the output capacitor C2 and the light source 2. When detecting that the output terminals of the buck converter 20d have recovered from an open-circuit state to a normal state, the protection circuit 60 suspends a switching operation of the buck converter 20d for a suspension time τ1.

For example, the protection circuit 60 may detect a recovery from an open-circuit state to a normal state on the basis of an output voltage $V_{OUT}$ of the buck converter 20d. After a lapse of the suspension time τ1, the protection circuit 60 may increase the switching duty ratio of the buck converter 20d slowly from zero (soft start).

Figure 7:
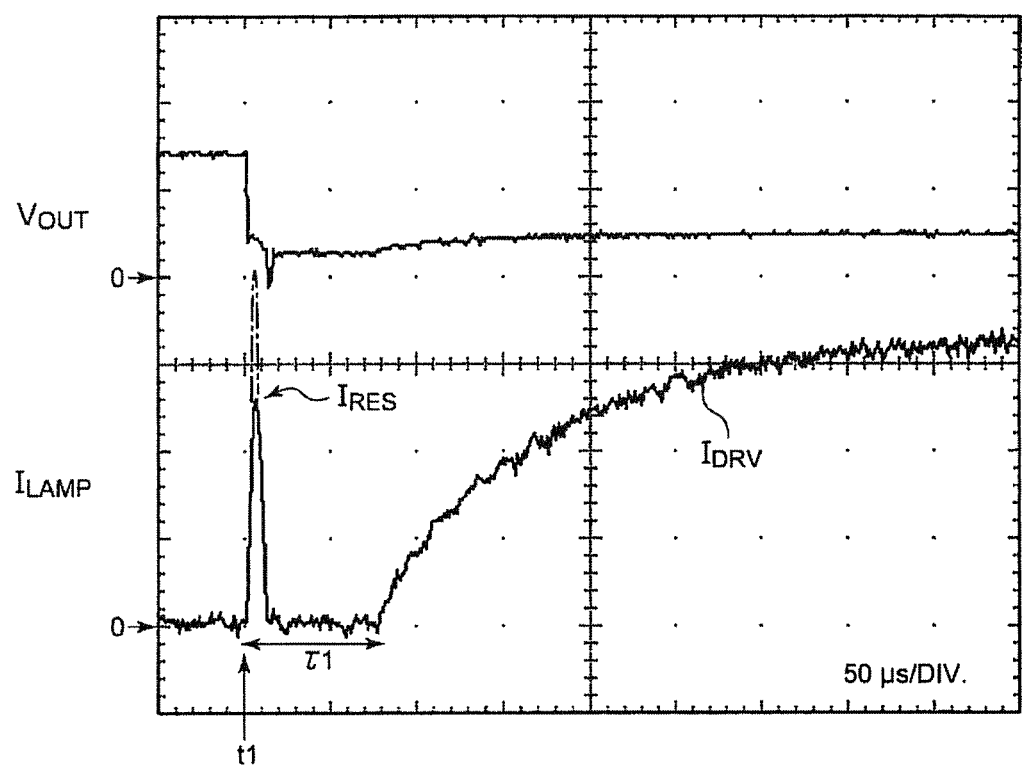
FIG. 7 is an operation waveform diagram of a lighting circuit shown in FIG. 6.

The basic configuration of the lighting circuit 10d has been described above. Next, a description will be made of how it operates. FIG. 7 is an operation waveform diagram of the lighting circuit 10d shown in FIG. 6. Before time t1, the connector 12 in an open-circuit state in which the drive current $I_{DRV}$ is equal to 0 A. The controller 22 drives the switching transistor M1 at a large duty ratio by a feedback control to increase the drive current $I_{DRV}$ from 0 A and make it come closer to the target value $I_{REF}$. As a result, a current flows into the output capacitor C2 through the inductor L1 and the output voltage $V_{OUT}$ becomes higher than in a normal state.

At time t1, the connector 12 is engaged properly again and restores a contact state (normal state). As a result, an excess part of the charge stored in the output capacitor C2 is supplied to the light source 2 via the output inductor L2. Since the output inductor L2 constitutes an LC resonation circuit 14 together with the output capacitor C2, a limited resonance current $I_{RES}$ flows into the light source 2 and hence an overcurrent is prevented. Pay attention to the fact that absent the output inductor L2 a lamp current $I_{LAMP}$ flowing through the light source 2 would increase without being restricted as indicated by a chain line in FIG. 7 to become an overcurrent.

The lamp current $I_{LAMP}$ is the sum of a drive current $I_{DRV}$ that is generated by the buck converter 20d by a feedback control and a resonance current $I_{RES}$ that flows through the resonation circuit 14. Since the resonance current $I_{RES}$ flows through the loop formed by the output capacitor C2 and the output inductor L2, a current detection signal $V_{IS}$ that is supplied to the controller 22 does not include the resonance current $I_{RES}$. Therefore, if the protection circuit 60 restarted a switching operation of the buck converter 20d immediately after the recovery from the open-circuit state to the normal state (i.e., the suspension time τ1 were omitted), a resonance current $I_{RES}$ would be superimposed on a drive current $I_{DRV}$ generated by the feedback control and a lamp current $I_{LAMP}$ could flow through the light source 2 in the form of an overcurrent.

In contrast, in the embodiment, at the time of a recovery from an open-circuit state to a normal state, the protection circuit 60 restarts a switching operation of the buck converter 20d after a lapse of the suspension time τ1. The suspension time τ1 may be determined taking into consideration a relaxation time that it takes for the resonance current $I_{RES}$ to become sufficiently small. With this measure, a drive current $I_{DRV}$ occurs after the resonance current $I_{RES}$ of the resonance circuit 14 has become small, whereby an overcurrent can be prevented.

If a soft start control were not performed when a switching operation is restarted after a lapse of the suspension time τ1, an overcurrent might occur due to the resonance of the inductor L1, the output capacitor C2, and the output inductor L2. In contrast, in the embodiment, such an overcurrent can be prevented by increasing the output current $I_{DRV}$ of the buck converter 20d slowly by a soft start.

Figure 8:
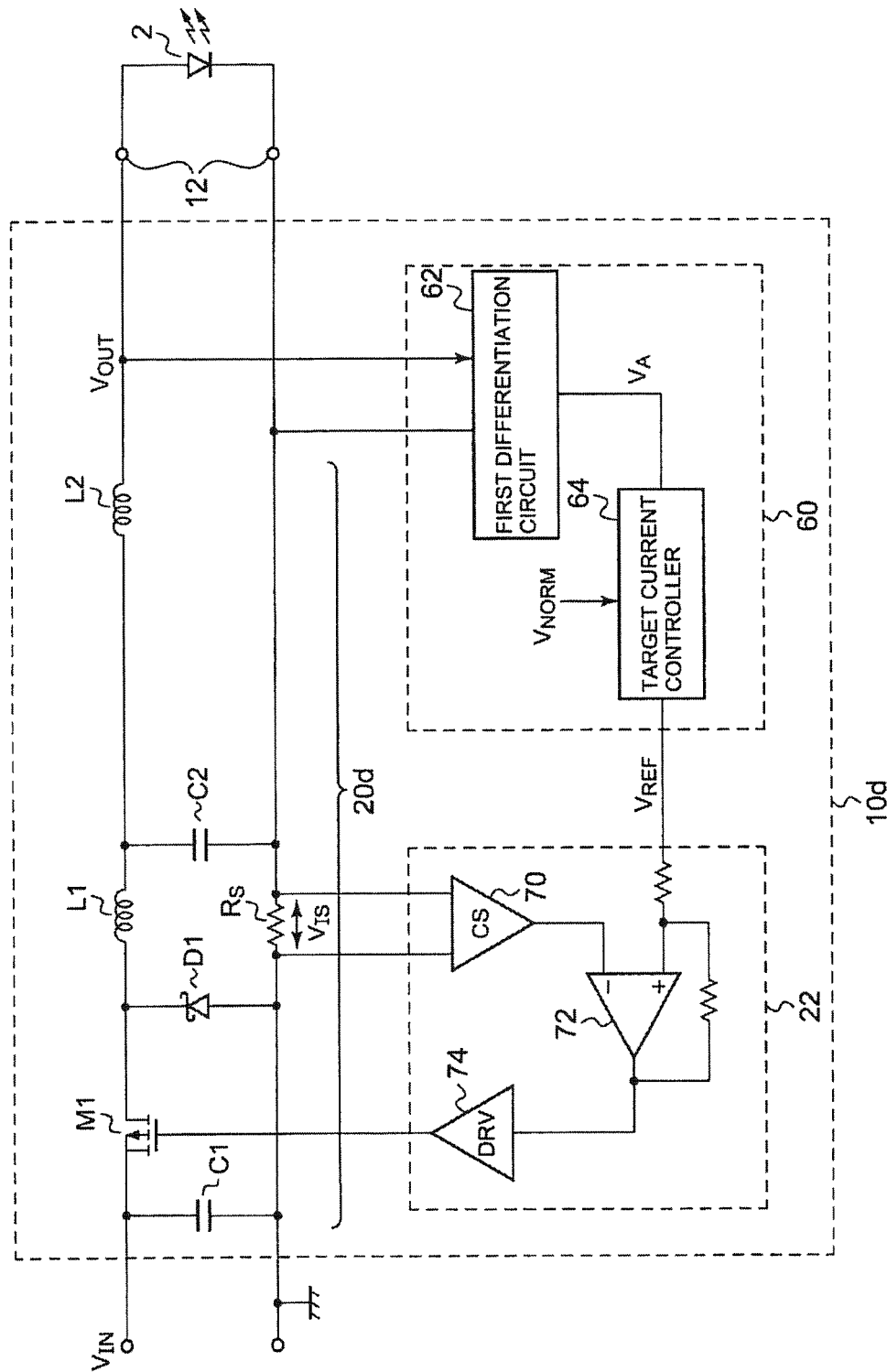
FIG. 8 is a circuit diagram showing a specific version of the lighting circuit shown in FIG. 6.

Next, the configuration of a specific version of the lighting circuit 10d shown in FIG. 6 will be described. FIG. 8 is a circuit diagram of a specific version of the lighting circuit 10d shown in FIG. 6. The controller 22, which performs a hysteresis control (bang-bang control), is equipped with a current sense amplifier 70, a hysteresis comparator 72, and a driver 74. For example, a detection resistor $R_S$ is inserted in the path of the drive current $I_{DRV}$ which is generated by the buck converter 20d. The current sense amplifier 70 amplifies a voltage drop $V_{IS}$ across the detection resistor $R_S$. The hysteresis comparator 72 compares the amplified voltage drop $V_{IS}$ with one, selected according to the output of itself, of two threshold voltages $V_H$ and $V_L$ and thereby generates modulated control pulses. The threshold voltages $V_H$ and $V_L$ are determined according to a reference voltage $V_{REF}$ which governs a target value $I_{REF}$ of the drive current $I_{DRV}$. The driver 74 drives the switching transistor M1 on the basis of the control pulses generated by the hysteresis comparator 72. Alternatively, the control method of the controller 22 may be a feedback control using an error amplifier.

As shown in FIG. 7, the output voltage $V_{OUT}$ drops instantaneously upon a recovery from an open-circuit state to a normal state (at time t1). The protection circuit 60 may detect a recovery to a normal state utilizing this phenomenon. That is, the protection circuit 60 may judge that a recovery from an open-circuit state to a normal state has occurred when the output voltage $V_{OUT}$ has dropped rapidly.

For example, the protection circuit 60 may include a first differentiation circuit 62 or a lowpass filter. For example, the absolute value of an output signal $V_A$ of the first differentiation circuit 62 increases as the downward slope of the output voltage $V_{OUT}$ becomes steeper. The output signal $V_A$ then returns to 0 V with the gradient that varies according to a time constant TC1 of the first differentiation circuit 62. The above-mentioned suspension time τ1 is determined by the time constant TC1.

A target current controller 64 adjusts the reference voltage $V_{REF}$ which governs the target value $I_{REF}$ of the drive current $I_{DRV}$ according to the output signal $V_A$ of the first differentiation circuit 62. More specifically, the target current controller 64 sets the reference voltage $V_{REF}$ at a normal value $V_{NORM}$ if the absolute value of the output signal $V_A$ of the first differentiation circuit 62 is lower than a prescribed threshold value $V_B$. In a state that the absolute value of the output signal $V_A$ of the first differentiation circuit 62 is higher than the threshold value $V_B$, the target current controller 64 sets the reference voltage $V_{REF}$ at 0 V (and hence the target current $I_{REF}$ at 0 A), whereby the switching operation of the buck converter 20d is suspended.

If the absolute value of the output signal $V_A$ of the first differentiation circuit 62 becomes lower than the threshold value $V_B$, the target current controller 64 increases the reference voltage $V_{REF}$ (target current $I_{REF}$) toward the normal value $V_{NORM}$ slowly. This makes it possible to perform a soft start after a lapse of the suspension time τ1.

Figure 9:
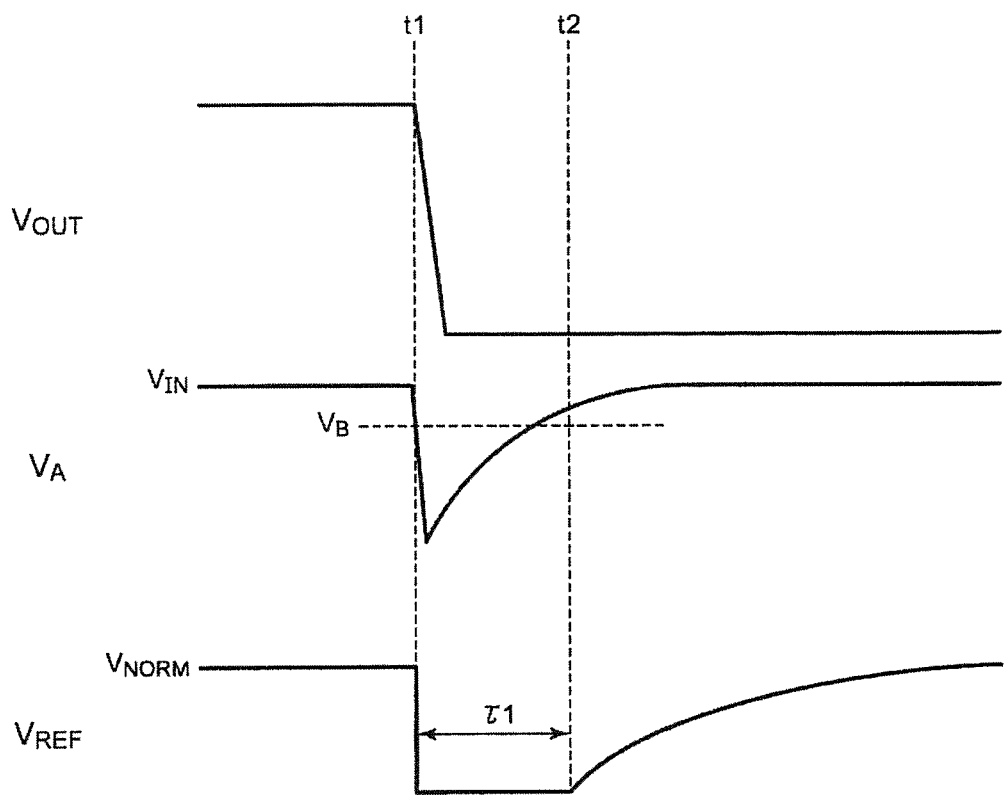
FIG. 9 is an operation waveform diagram of the lighting circuit of FIG. 8.

FIG. 9 is an operation waveform diagram of the lighting circuit 10d of FIG. 8, and shows how the lighting circuit 10d operates when a proper contact state of the connector contact 12 is restored. When a proper contact state of the connector 12 is restored at time t1, the output voltage $V_{OUT}$ drops rapidly and then the absolute value of the output signal $V_A$ of the first differentiation circuit 62 increases beyond the threshold value $V_B$. As a result, the reference voltage $V_{REF}$ drops to 0 V from the normal value $V_{NORM}$ and the switching operation of the buck converter 20d is suspended.

Then the absolute value of the voltage $V_A$ decreases according to the time constant TC1 of the first differentiation circuit 62 and becomes lower than the threshold value $V_B$ at time t2. In response, the target current controller 64 increases the reference voltage $V_{REF}$ slowly. With the above operation, a delay time from time t1 to time t2 serves as a suspension time τ1.

Figure 10:
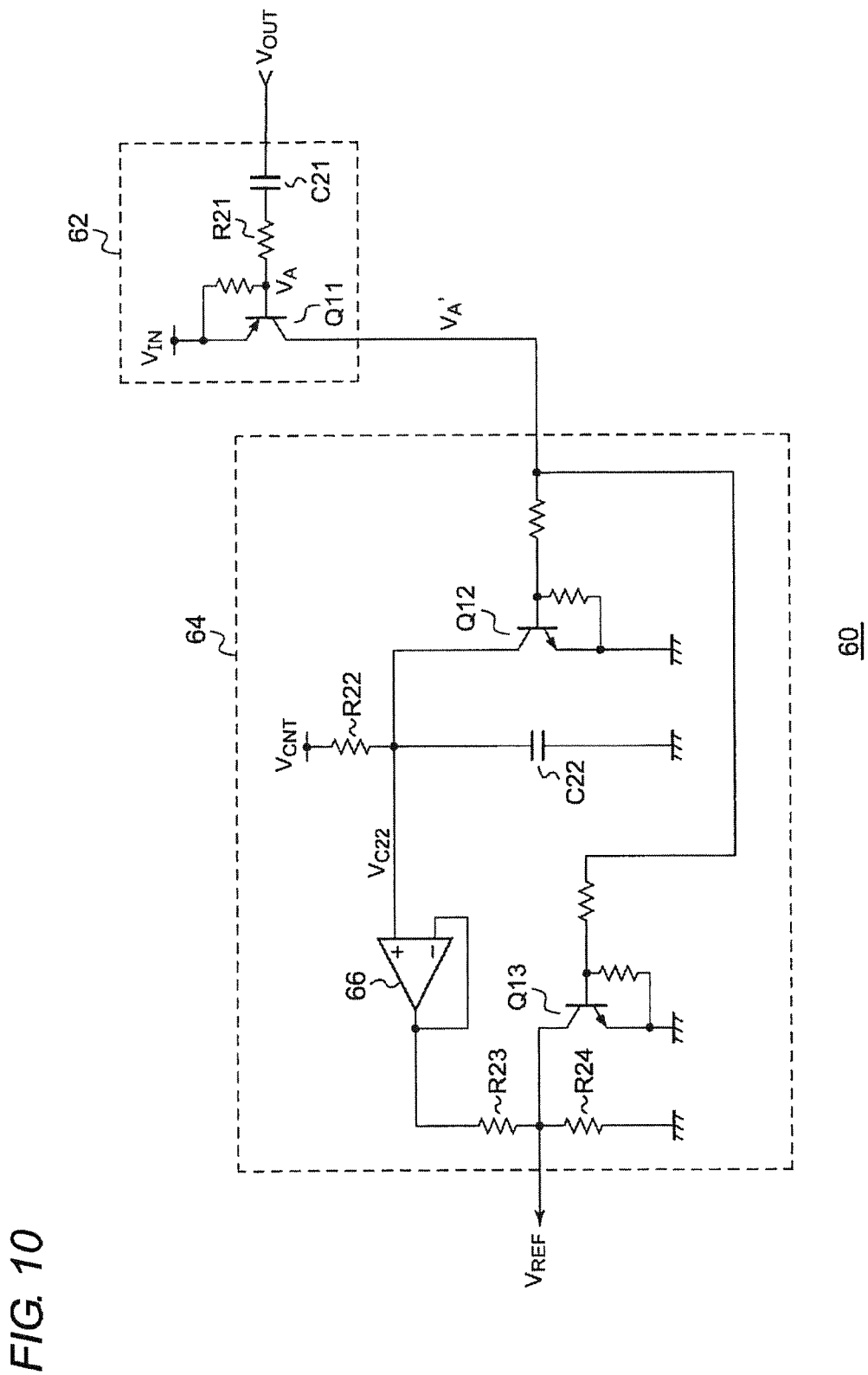
FIG. 10 is a circuit diagram showing the configuration of a specific version of a protection circuit.

FIG. 10 is a circuit diagram showing the configuration of a specific version of the protection circuit 60. The first differentiation circuit 62 mainly includes a bipolar transistor Q11, a capacitor C21, and a resistor R21. Having this configuration, the first differentiation circuit 62 generates a signal $V_A$ that reflects the gradient of the downward slope of the output signal $V_{OUT}$. The time constant TC1 of the first differentiation circuit 62 is determined by the resistor R21 and the capacitor C21. The first differentiation circuit 62 can be considered a highpass filter.

The target current controller 64 mainly includes a capacitor C22, a charging resistor R22, and a discharge switch Q12. One end of the capacitor C22 is grounded. The charging resistor R22 serves to apply, to the capacitor C22, a voltage $V_{CNT}$ which determines the normal value $V_{NORM}$ of the reference voltage $V_{REF}$. When the discharge switch Q12 is off, the voltage $V_{C22}$ across the capacitor C22 is equal to the voltage $V_{CNT}$.

The voltage $V_{C22}$ across the capacitor C22 is applied to a voltage division circuit, which is composed of resistors R23 and R24, via a buffer 66, whereby a reference voltage $V_{REF}$ is generated.

An output signal $V_A'$ of the first differentiation circuit 62 is input to the base of the discharge switch Q12 which is an npn bipolar transistor. If the base voltage $V_A$ of the transistor Q11 of the first differentiation circuit 62 becomes lower than its transistor on/off threshold value (above-mentioned threshold voltage) $V_B$ and the output signal $V_A'$ of the first differentiation circuit 62 thereby exceeds the base-emitter threshold value $V_{BE}$ of the discharge switch Q12, the discharge switch Q12 is turned on, whereby the voltage $V_{C22}$) across the capacitor C22, and hence the reference voltage $V_{REF}$, becomes equal to 0 V. The discharge switch Q12 not only is a voltage comparing means but also has a function of resetting the reference voltage $V_{REF}$ to 0 V.

If the base voltage $V_A$ of the transistor Q11 exceeds the threshold value $V_B$, the transistor Q11 is turned off and the discharge switch Q12 is also turned off, whereby the capacitor C22 is charged via the resistor R22. During that course, the voltage $V_{C22}$ across the capacitor C22 increases with the CR time constant TC1. This realizes the above-mentioned soft start. Since the transistor Q11 is a pnp bipolar transistor and receives an input voltage $V_{IN}$ at its emitter, it operates with the input voltage $V_{IN}$ as a reference. Therefore, attention should be paid to the fact that the transistor Q11 is turned on when the voltage $V_A$ becomes lower than the threshold value $V_B$ and turned off when the voltage $V_A$ becomes higher than the threshold value $V_B$.

Where the buffer 66 has a long response delay time, a transistor Q13 is added. When the signal $V_A'$ exceeds the threshold voltage $V_{BE}$ (=$V_B$) of the transistor Q13, the transistor Q13 is turned on and pulls down a reference voltage $V_{REF}$ occurring at the connection node of the voltage division circuit which is composed of the resistors R23 and R24 to 0 V directly. Where the buffer 66 operates at high speed, the transistor Q13 and the resistors R23 and R24 can be omitted.

(Modifications of Embodiment 2)
(Modification 2.1)

Although the technique for preventing an overcurrent at the time of a recovery from an open-circuit state to a normal state has been described above, this technique can also be used for preventing an overcurrent at the time of a recovery from a short-circuit state to a normal state. This can be done in a way that the protection circuit 60 suspends a switching operation of the buck converter 20d for a suspension time τ2 upon detecting a recovery from a short-circuit state to a normal state at the output terminal of the protection circuit 60. The suspension time τ2 may either the same as or different from the suspension time τ1.

Figure 11:
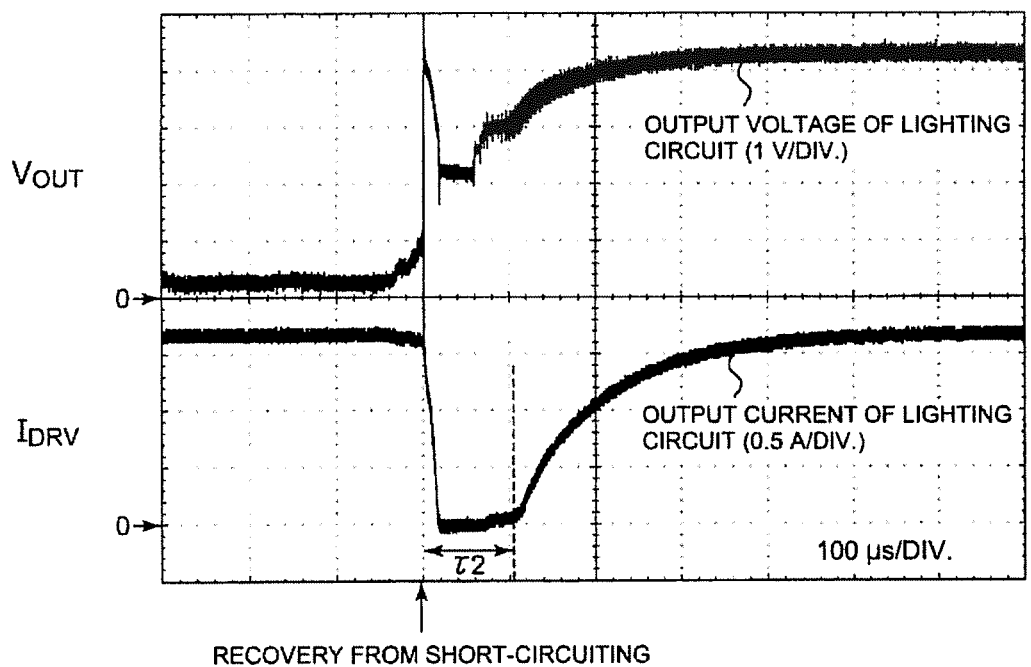
FIG. 11 is a circuit diagram showing an operation that is performed upon a recovery from a short-circuit state to a normal state.

FIG. 11 is a waveform diagram showing an operation that is performed upon a recovery from a short-circuit state to a normal state. In a short-circuit state, the output voltage $V_{OUT}$ is fixed at a voltage around 0 V. A drive current $I_{DRV}$ that is generated by the buck converter 20d is stabilized at a target value $I_{REF}$ even in the short-circuit state. Upon a recovery from the short-circuit state to a normal state (time t1), the output voltage $V_{OUT}$ jumps high. Therefore, when the output voltage $V_{OUT}$ of the buck converter 20d has risen rapidly, the protection circuit 60 can judge that a recovery from a short-circuit state to a normal state has occurred.

The protection circuit 60 may include a second differentiation circuit 62s (e.g., one shown in FIG. 12) or a lowpass filter in place of the above-described first differentiation circuit 62. An output signal of the second differentiation circuit 62s increases as the upward slope of the output voltage $V_{OUT}$ becomes steeper. The output signal of the second differentiation circuit 62s then returns to 0 V with the gradient that varies according to a time constant TC2 of the second differentiation circuit 62s. Thus, this modification can prevent an overcurrent at the time of a recovery from a short-circuit state.

(Modification 2.2)

A protection circuit can be configured so as to accommodate both of a recovery from an open-circuit state and a recovery from a short-circuit state. For example, two systems of protection circuits 60 may be provided for a recovery from an open-circuit state and a recovery from a short-circuit state. Alternatively, a configuration shown in FIG. 8 is possible in which two systems of differentiation circuits, that is, a first differentiation circuit 62 for a recovery from an open-circuit and a second differentiation circuit 62s for a recovery from a short-circuit state, and a common target current controller 64 are provided.

Figure 12:
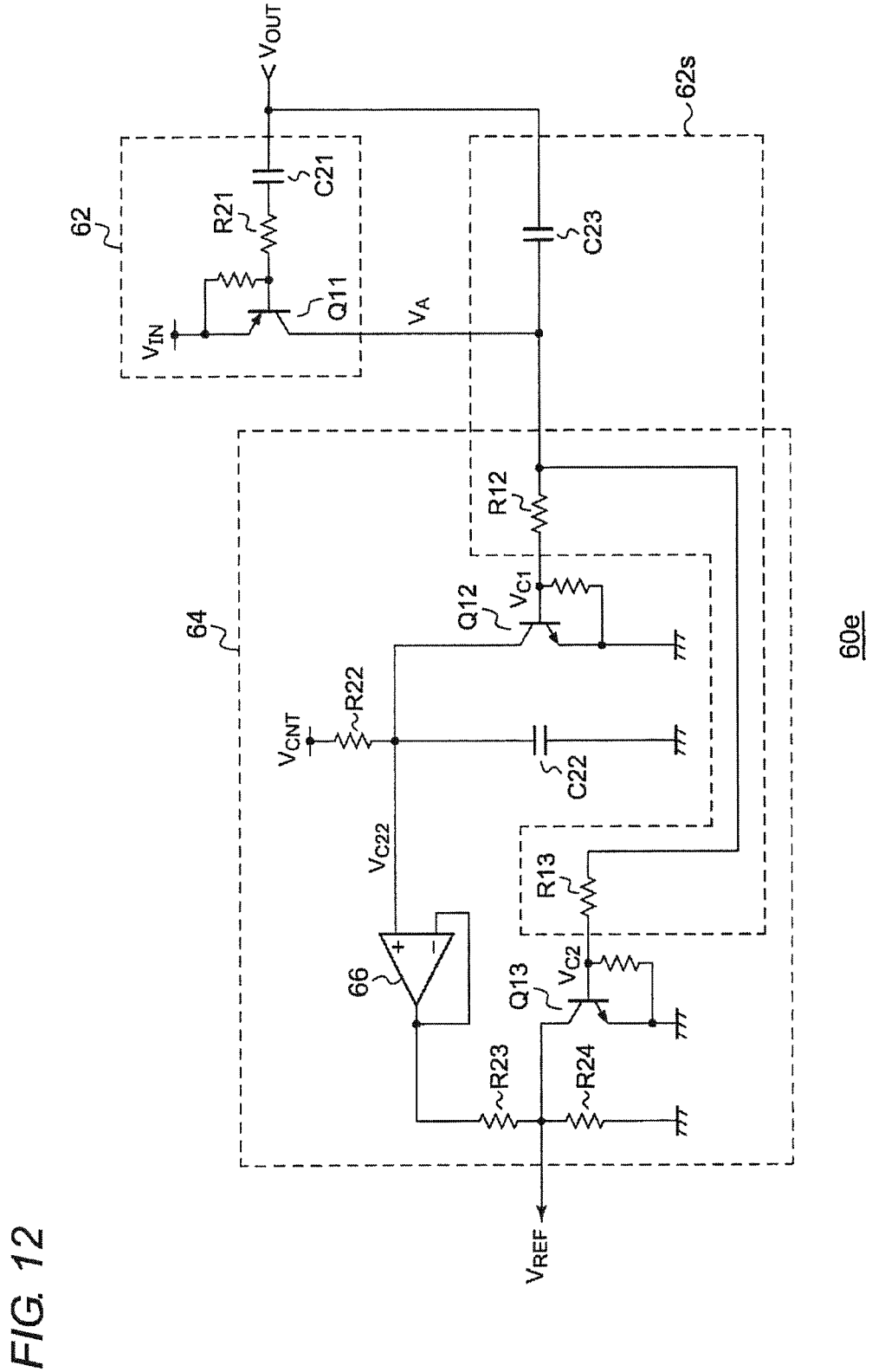
FIG. 12 is a circuit diagram of a protection circuit according to Modification 2.2.

FIG. 12 is a circuit diagram of a protection circuit 60e according to Modification 2.2. The protection circuit 60e is different from the protection circuit 60 of FIG. 10 in being additionally equipped with a capacitor C23. The capacitor C23 constitutes a second differentiation circuit 62s for a recovery from a short-circuit state together with a base resistor R12 of the transistor Q12 and a base resistor R13 of the transistor Q13. The second differentiation circuit 62s generates voltages $V_{C1}$ and $V_{C2}$ according to the gradient of a positive edge of an output voltage $V_{OUT}$. The transistors Q12 and Q13 are turned on when the respective output signals $V_{C1}$ and $V_{C2}$ of the second differentiation circuit 62s exceed a prescribed value $V_B$.

The output signals $V_{C1}$ and $V_{C2}$ of the second differentiation circuit 62s increase as the upward slope of the output voltage $V_{OUT}$ becomes steeper. The output signals $V_{C1}$ and $V_{C2}$ then return to 0 V with the gradients that vary according to the time constant TC2 of the second differentiation circuit 62s. The suspension time τ2 of a recovery from a short-circuit state is determined by the time constant TC2.

The protection circuit 60e of FIG. 12 can prevent an overcurrent at the time of both of a recovery from an open-circuit state to a normal state and a recovery from a short-circuit state to a normal state. A protection circuit obtained by deleting the first differentiation circuit 62 from the protection circuit 60e of FIG. 12 can prevent an overcurrent at the time of a recovery from a short-circuit state to a normal state.

(Use)

Figure 13:
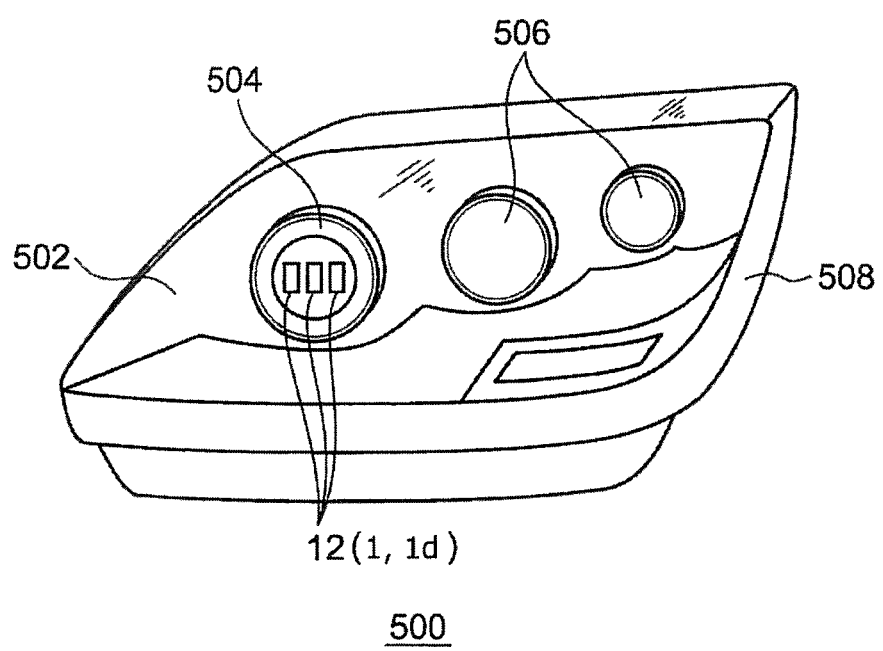
FIG. 13 is a perspective view of a lamp unit that is equipped with the vehicle lamp according to the first or second embodiment.

Finally, a description will be made of how the vehicle lamps 1 and 1d are used. FIG. 13 is a perspective view of a lamp unit (lamp assembly) 500 that is equipped with the vehicle lamp 1 or 1d according to the first or second embodiment. The lamp unit 500 is equipped with a transparent cover 502, a high-beam unit 504, low-beam units 506, and a body 508. For example, the above-described vehicle lamp 1 or 1d can be used as the high-beam unit 504. The vehicle lamp 1 or 1d may be used as each low-beam unit 506 instead of or in addition to the high-beam unit 504.

Although the present invention has been described above in the form of the embodiments using the specific terms, the embodiments just indicate the principle and applications of the present invention and various modifications and changes in the arrangement of components are possible for the embodiments without departing from the concept of the present invention as described in the claims.

The invention claimed is:

1. A lighting circuit comprising:
    a buck converter which supplies a drive current to a light source and is feedback-controlled so that the drive current comes close to a target current; and
    an open-circuit detection circuit which compares a potential difference between an input voltage and an output voltage of the buck converter with a prescribed threshold voltage and which outputs an abnormality detection signal showing an open-circuit abnormality if the potential difference is lower than the prescribed threshold voltage.

2. The lighting circuit according to claim, wherein the open-circuit detection circuit comprises a positive-negative-positive (pnp) bipolar transistor whose emitter and base are connected to an input terminal and an output terminal of the buck converter, respectively.

3. The lighting circuit according to claim 2, wherein the open-circuit detection circuit further comprises a first resistor that is provided between a collector of the bipolar transistor and the ground.

4. The lighting circuit according to claim 1, wherein the open-circuit detection circuit comprises a p-channel field-effect transistor (FET) having a source and a gate that are connected to an input terminal and an output terminal of the buck converter, respectively.

5. The lighting circuit according to claim 4, wherein the open-circuit detection circuit further comprises:
    a clamp element provided between the gate and the source of the p-channel FET; and
    a second resistor provided between a drain of the p-channel FET and ground.

6. A vehicle lamp comprising:
    a light source; and
    the lighting circuit according to claim 1 which drives the light source.

* * * * *